Figure 1:
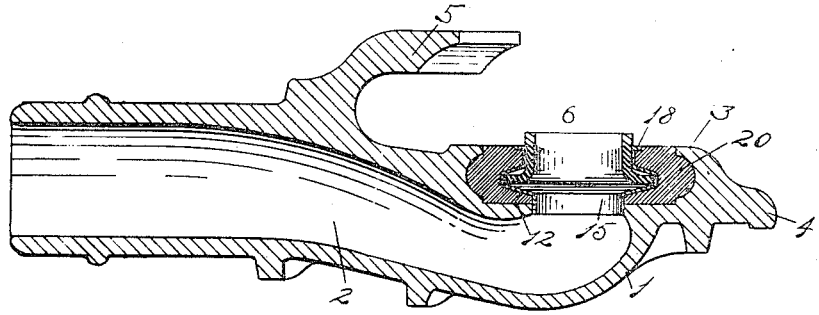

J. S. SHEAFE.
HOSE COUPLING.
APPLICATION FILED AUG. 24, 1914.

1,137,913.

Patented May 4, 1915.

Witnesses:
H. Small
Roe S. Johnston

Inventor
James S. Sheafe
by Hull & Smith
Attorneys

UNITED STATES PATENT OFFICE.

JAMES S. SHEAFE, OF NEW BRIGHTON, NEW YORK.

HOSE-COUPLING.

1,137,913.   Specification of Letters Patent.   Patented May 4, 1915.

Application filed August 24, 1914. Serial No. 858,201.

*To all whom it may concern:*

Be it known that I, JAMES S. SHEAFE, a citizen of the United States, residing at New Brighton, Staten Island, in the borough of Richmond and State of New York, have invented a certain new and useful Improvement in Hose-Couplings, of which the following is a full, clear, and exact description, reference being had to the accompanying drawings.

This invention relates to hose couplings and has particular reference to that type of hose couplings employed between adjacent cars of railway trains to secure together the air pipe hose and signal hose, although some features of the same may be susceptible of use in other relations.

In my prior patent dated May 18, 1909, No. 922,347, I disclosed an improvement in couplings consisting in providing the usual, one-piece, malleable iron coupler with a separate gasket-receiving ring of non-corrodible metal rigidly and non-leakably secured in the face of the coupler. In that patent I illustrated as the preferred embodiment of my invention, a coupling member having a recess bored or reamed in its forward face and a gasket retaining member made of brass or the like metal, machined to shape prior to its attachment to the coupling head so as to fit accurately in said recess. Experience has demonstrated that while this forms an admirable coupling and exhibits all of the advantages contemplated in my earlier specification, the commercial construction of the same entails certain difficulties chief among which is the destruction of the boring or reaming tools occasioned by the hardness of the metal and the presence of scale and sand, the result being that when the coupling heads are prepared as above described the sizes of the recesses vary to such an extent as to require the members to be fitted individually.

It is the object of the present invention to provide a new, simplified and less expensive construction and process whereby the manufacturer of these couplings may be facilitated and all of the operating advantages of the same retained.

Figure 2:
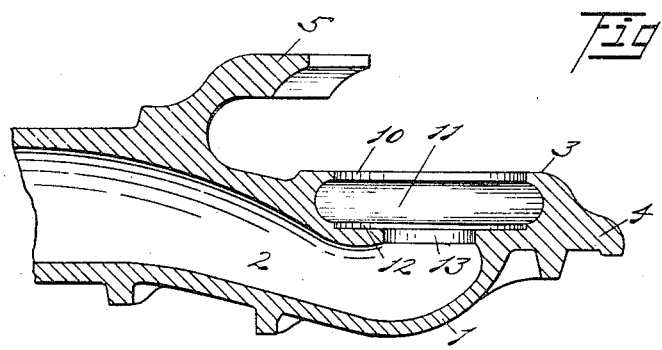
Figure 3:
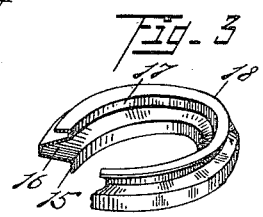
Figures 4, 5:
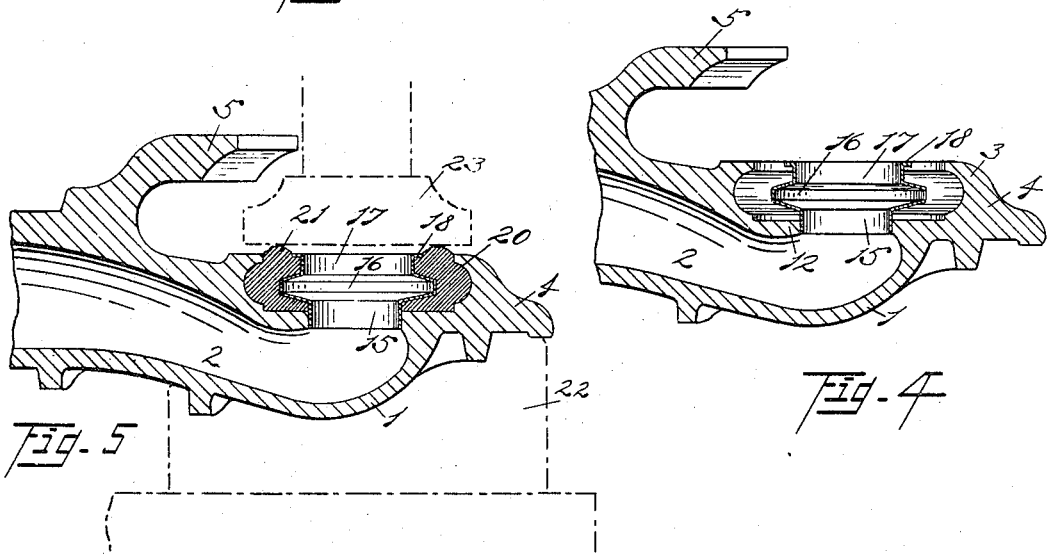

Generally speaking my invention consists of the steps, processes, and devices recited in the claims hereof and illustrated in the drawings accompanying and forming a part of this application, wherein:

Figure 1 is a longitudinal, central, sectional view through a coupling head constructed in accordance with my invention; Fig. 2 is a similar view showing the naked head prior to the application of the gasket seat thereto; Fig. 3 is a broken perspective view of the lining ring of my improved gasket seat; Fig. 4 is a view similar to Fig. 2 but showing the lining ring in place in the coupling head; and Fig. 5 is a similar view showing the filling material after being cast in place.

Describing the parts by reference characters 1 represents conventionally a coupling head of the type ordinarily employed in connection with air brake hose, the same having a longitudinal bore 2 turned abruptly at the end of the coupling and opening through the flat lateral face 3 thereof, the coupling head being also formed with flanges 4, 5 adapted to coöperate with the similar flanges of another coupler (not shown). With such a coupling there is customarily used a gasket 6 which, in the construction of my former patent, fits in an annular groove formed in the gasket seat, and in the construction prior to my patent was introduced into a groove formed directly in the metal of the coupling head.

According to my invention I form the face 3 at a point surrounding the bore with a recess 10 preferably considerably undercut as illustrated at 11 and terminating at the bottom in a wall 12 formed with a circular aperture 13. In the case of a new coupling this recess may be formed by coring, and in an old coupling it may be formed by routing out the metal with any suitable tool, the irregularity of the surface occasioned by coring or the variation in diameter caused by wearing of the tool being unimportant. I then form from thin non-corrodible metal, such as brass, copper, zinc, or the like, a lining ring as shown in detail in Fig. 3, the same comprising a cylindrical lip 15 of a diameter to fit snugly within the aperture 13; an inwardly opening annular groove 16 above this first cylindrical portion and formed by bending first outwardly and then inwardly the metal of the ring; a second cylindrical portion 17 above said grooved portion and concentric with the portion 15 but of slightly greater diameter; and an outturned flanged portion 18 adapted to lie substantially in the plane of the face 3. This lining ring is preferably made by a pressing or stamping operation which can be very cheaply performed and result in a product of absolutely uniform size. I then coat the exterior surface of the grooved portion 16 with some easily fusible adherent alloy such as solder, preferably by the process called "tinning." I next insert this ring in the coupling as shown in Fig. 4 and thereafter cast into the recess about the same a suitable metallic alloy as shown at 20. I do not confine myself to any particular alloy so long as the same is sufficiently tenacious, ductile, resistant to corrosion, and of the proper melting temperature. The metal or alloy employed should be such as will alloy well with the coating applied to the exterior of the ring so that a perfectly leak-proof joint will be obtained. However I do not confine myself to the use of metal, either for the lining ring or the filling material, although I consider metal preferable.

It is theoretically possible to choose the composition of the alloy and to cast the same into the recess with such exactness that the recess shall be exactly full after cooling and so that the surface of the same shall be flat and smooth with little or no further attention; also it is possible to fill the recess more than full, and afterward cut off the excess metal with a lathe or other tool, as will be well understood by those skilled in metal working. However I prefer, for reasons of economy and expedition, to cast the recess slightly overfull as shown at 21 in Fig. 5 and afterward interpose the coupling between the members 22 and 23 of a hydraulic or other powerful press and solely by pressure reduce the same to the proper shape and face. This serves not only to compact the metal itself but to force it closely into contact with the outer wall of the recess 11, and if the amount of metal is unduly great will slightly constrict the lining 17 so as to take care of any reasonable excess without attention.

While I have described my invention in detail it will be apparent that many changes could be made and that various steps could be left out or modified without losing the benefits of my improvement or departing from the scope of my inventive idea.

Having thus described my invention, what I claim is:

1. A coupling head for train pipe hose having a bore therethrough and a recess surrounding said bore, a non-corrodible gasket-engaging ring projecting into said bore and traversing said recess at a distance from the walls thereof, and non-corrodible filling material occupying the space between said ring and the recess wall.

2. The combination, with the coupling head of a train pipe hose, said head having a bore therethrough and a recess surrounding and merging with said bore, of a gasket-engaging ring of non-corrodible material traversing said recess and communicating with said bore, said ring being spaced from the walls of said bore to define an annular cavity, and non-corrodible filling material occupying such cavity and making a tight joint with said ring and the recess walls.

3. The combination, with the coupling head of a train pipe hose, said head having a bore therethrough and a recess surrounding and merging with said bore, of an interiorly grooved ring traversing said recess and communicating with said bore, the groove being located between the top and bottom of said recess and the ring being spaced from the recess walls, and non-corrodible cast material filling the portion of said recess outside of said ring and making close contact with the ring and recess walls.

4. The combination, with the coupling head of a train pipe hose, said head having a bore therethrough and a recess surrounding and merging with said bore, of a thin metal lining ring traversing said recess and communicating with said bore, said ring being embossed outwardly at a point intermediate its ends to form an inwardly opening annular groove, the outwardly projecting portions of said ring being located between the top and bottom of said recess, and non-corrodible cast material filling the portion of said recess outside of said ring and making close contact with the ring and recess walls.

5. The combination, with the coupling head of a train pipe hose, said head having a bore therethrough and a recess surrounding and merging with said bore, of a gasket-receiving ring of non-corrodible material traversing said recess and forming a continuation of said bore, said ring being constructed to close said recess away from said bore and also having intermediate its ends an inwardly opening annular groove, and filling material of a nature more fusible than either said head or said ring cast into said recess around said ring.

6. In a hose coupling, the combination, with a metallic coupling head having a bore and a recess surrounding said bore and opening through the meeting face of the coupling, of a thin metal, gasket-receiving ring traversing said recess and having intermediate its ends an inwardly-opening annular groove, the exterior surface of said ring being tinned, and an alloy of a more fusible nature than either said coupler head or said ring cast into said recess.

7. In a hose coupling, the combination, with a metallic coupling head having a bore and a recess surrounding said bore and opening through the meeting face of the coupling, said recess having an undercut wall, of a thin metal ring traversing said recess and having an external circumferential rib opposite the undercut portion of said recess wall, said ring communicating with and forming a continuation of said bore, and a filling of fusible material cast into the space between said wall and ring and interlocked with said rib and undercut portion.

8. In a hose coupling, the combination, with a metallic coupling head having a bore and a recess surrounding said bore and opening through the meeting face of the coupling, of a thin metal ring traversing said recess and having at one end a cylindrical portion fitting into said bore, said ring having provisions for receiving and retaining a gasket, and a filling of fusible material cast into said recess outside of said ring.

9. In a hose coupling, the combination, with a metallic coupling head having a bore and a recess surrounding said bore and opening through the meeting face of the coupling, of a thin metal ring traversing said recess and having a flange at each end and an inwardly opening annular groove intermediate its ends, one of said flanges serving to intercept communication between said bore and recess and the other of said flanges lying substantially in the plane of the coupler-face, and a filling of solidified material cast into said recess outside of said ring.

10. In a hose coupling, the combination, with a metallic coupling head having a bore and a recess surrounding said bore and opening through the meeting face of the coupling, of a thin metal, gasket-receiving ring traversing said recess, said ring having intermediate its ends an inwardly opening annular recess and having a cylindrical portion at each side of said recess the diameter of one of said portions being greater than that of the other portion, the portion of smaller diameter communicating with and forming a continuation of the coupling bore, and a filling of fusible material cast into said recess outside of said ring.

11. In a hose coupling, the combination, with a metallic coupling head having a bore and a recess surrounding said bore and opening through the meeting face of the coupling, of a thin metal, gasket-receiving ring traversing said recess, said ring having intermediate its ends an inwardly opening annular recess and a cylindrical portion at each side of said recess, one of said cylindrical portions communicating with and forming a continuation of said bore and the other having an outturned flange lying substantially in the plane of the coupler face, and a filling of fusible material cast into said recess outside of said ring and beneath said flange.

12. As an article of manufacture and sale, a gasket retaining ring for hose-couplings, formed of thin sheet metal and having intermediate its ends an inwardly opening annular groove and a cylindrical portion at each side of said groove, said ring being adapted for insertion into the recessed end of a hose coupling with its cylindrical portions communicating with and forming continuations of the bore thereof, and also adapted to be secured in place by having fusible material cast into the recess surrounding the same.

13. As an article of manufacture and sale, a gasket retaining ring for hose-couplings, formed of thin sheet metal and having intermediate its ends an inwardly opening annular groove and a cylindrical portion at each side of said groove, one of said cylindrical portions being of larger diameter than the other, the size of the smaller portion being substantially equal to that of the coupling bore and the diameter of the larger portion being substantially equal to that of the gasket.

14. As an article of manufacture and sale, a gasket retaining ring for hose-couplings, formed of thin sheet metal and having intermediate its ends an inwardly opening annular groove and a cylindrical portion at each side of said groove, the outer surface of said ring being tinned.

15. As an article of manufacture and sale, a gasket retaining ring for hose-couplings, formed of thin sheet metal and having a portion intermediate its ends embossed outwardly to form an inwardly opening annular groove and an outwardly projecting circumferential rib, there being a cylindrical portion at each side of said groove and the external surface of said rib being tinned.

In testimony whereof I hereunto affix my signature in the presence of two witnesses.

JAMES S. SHEAFE.

Witnesses:
FRANCIS J. DOLAN,
HARRY LAWRENCE.